June 12, 1923.

T. SLOPER

1,458,732

METHOD OF AND APPARATUS FOR MANUFACTURING ARTICLES COMPRISING
SUPERPOSED LAYERS OF FABRIC

Filed June 17, 1921

June 12, 1923.  
T. SLOPER  
METHOD OF AND APPARATUS FOR MANUFACTURING ARTICLES COMPRISING SUPERPOSED LAYERS OF FABRIC  
Filed June 17, 1921

June 12, 1923.                                                          1,458,732
T. SLOPER
METHOD OF AND APPARATUS FOR MANUFACTURING ARTICLES COMPRISING
SUPERPOSED LAYERS OF FABRIC
Filed June 17, 1921          4 Sheets-Sheet 4

Inventor
Thomas Sloper
by Bakewell Byrnes & Parmelee
his Attorneys

Patented June 12, 1923.

1,458,732

UNITED STATES PATENT OFFICE.

THOMAS SLOPER, OF DEVIZES, ENGLAND.

METHOD OF AND APPARATUS FOR MANUFACTURING ARTICLES COMPRISING SUPERPOSED LAYERS OF FABRIC.

Application filed June 17, 1921. Serial No. 478,318.

*To all whom it may concern:*

Be it known that I, THOMAS SLOPER, a subject of the King of England, residing at Devizes, Wiltshire, England, have invented certain new and useful Improvements in Methods of and Apparatus for Manufacturing Articles Comprising Superposed Layers of Fabric, of which the following is a specification.

This invention relates to apparatus for use in the manufacture of fabric-containing rubber goods, and to methods of handling or manipulating such goods during manufacture, and a primary object is to provide a method of manufacturing tires which are built up in the "flat" by superposed layers in such a manner that the different layers of fabric may, while in the "flat" form, be under varying degrees of tension according to their position relatively to that side of the tire which is to be outermost when the tire is finished.

The method of manufacturing a tire or other article comprising superposed layers built up in the "flat" but afterwards to be shaped and "set," as for example by vulcanizing, consists according to this invention in mechanically contracting one or more of the layers of fabric or parts thereof prior to their being built into the article, or during the process of building, for the purpose of providing for subsequent stretching of such layers or parts of layers when the fabric is shaped without putting them under greater tension than other layers or parts of layers of the fabric which are not contracted, because such other layers or parts of layers do not have to be stretched to the same extent during shaping.

Preferably those layers to be subjected to the greater degree of stretching or distortion, when the article is finally shaped, are subjected to the greater degree of contraction prior to shaping, The varying degrees of contraction for the different layers may be brought about by first contracting one layer, then securing adhesively thereto a second layer and submitting both to a contracting action, and so on, according to the number of layers required.

The steps in the method of contracting the fabric, for the purpose described, may comprise the following:

(*a*) Placing the fabric prior to shaping it over the face of a member which is recessed, (*b*) forcing the fabric (preferably by fluid pressure) into the recessed portion of the face in such manner that the edges of the fabric are drawn inwards and more fabric is gathered up within the area of said face than would be the case if the fabric extended across the said recessed portion; (*c*) retaining the edges in the inward position to which they have been drawn but forcing the fabric out of the recessed portion (preferably by fluid pressure) against a "flat" support, and (*d*) securing by adhesive means a retaining layer of material to the contracted layer of fabric.

Another object of the invention is to provide apparatus for use in carrying into practice the method described above. To this end, apparatus for mechanically contracting fabric comprises in combination, a supporting member for the fabric having a "flat" face, an opposed member recessed on the face towards the "flat" faced member, gripping means, preferably resilient lips, on one of the members so arranged that they will bear or can be made to bear upon the other member at the points occupied by the edges of the fabric when in position, and means for establishing fluid pressure at will on one or on either side of the fabric when placed between these two members for the purpose of first pressing the fabric into the recessed face of the one member and then pressing it back upon the "flat" face of the co-operating member.

Apparatus according to this invention for making "flat" endless bands of fabric, such as are employed in the manufacture of tires, comprises in combination an inner member having a cylindrical surface to receive the band, an outer surrounding member having that face which is towards the inner member recessed, annular lips of resilient material such as rubber carried by one member directed to bear against the other member, and means for establishing at will fluid pressure on one or on either side of the band when in position, with or without means for establishing fluid pressure to press the lips home against the band for the purpose described.

The invention will now be described in detail with reference to the manufacture of the fabric base for pneumatic tires. It is well known that according to one method of manufacture this fabric base is made of superposed layers of rubbered fabric which are built up in the form of a "flat" endless band and after the rubber covering has been built on to this band the whole is partially vulcanized and then shaped to the well known tire-cover form. It will be appreciated that during this shaping, those layers of fabric which are outer-most in the finished tire are stretched more than those of the innermost layer so that the different layers are not under equal tension. This causes the outer layers of fabric to be placed under greater strain than the inner which is detrimental to the life of the tire. A further object of the present invention is to mechanically contract the fabric of those layers which will finally be outermost in the tire, so that when the fabric is shaped all the layers shall be under approximately equal tension.

In operation the fabric to be contracted is supported on a member whose shape corresponds to the original shape in which the fabric is built and the whole is surrounded by an outer member which is recessed on the inner circumferential face to provide a larger area for the fabric than that afforded by the member on which the fabric is mounted. In most cases the face of the member upon which the fabric is mounted would be plain, and for convenience throughout this specification this face will be described as the "flat" face in contrast to the recessed face of the co-operating member, although in actuality the said "flat" face will usually be cylindrical, as the invention is mainly applicable to the manufacture of tires in the form of endless flat bands. Whatever form this "flat" face takes, however, it is such as affords less superficial area for the fabric than does the corresponding portion of the opposed member.

Still another object is to provide apparatus adapted for removing a tire-band from a support or mold on which it is carried, by establishing a difference of fluid pressure at the two sides of the band.

To these ends, the invention consists in the operations, and in the construction, arrangement and combination of parts described hereinafter and pointed out in the claims.

In the accompanying drawings—

Like reference numerals indicate like parts throughout the figures.

Figure 2:
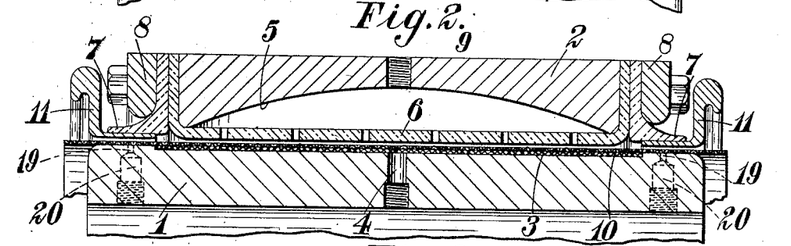
Figure 2 is a like view through the said member with the support and guide-rings, hereinafter described, in place.

The support 1, Figure 2, is an annular member supported from the centre in any convenient manner so that it can be brought into and out of the opposed co-operating annular member 2. The support has a cylindrical face which is recessed to receive a gauze layer 3 constituting part of the aforesaid "flat" face for the fabric, and a conduit 4 communicates with this gauze layer. This conduit is intended to be connected to exhaust apparatus for creating a vacuum or partial vacuum in the recess occupied by the gauze layer.

The annular member 2 is recessed at 5 on its inner face but has stretched across it a perforated rubber diaphragm 6. At each edge is a jointing-ring 7 of rubber, which rings are clamped in position by side rings 8; the said side rings also hold the diaphragm 6 in position. The jointing-rings provide inwardly projecting lips which when the support 1 is brought into position within the member 2 bear against the said member. The member 2 has a conduit 9 for connection to an exhaust-pump so that a vacuum or partial vacuum can be formed in the recess 5.

Figure 1:
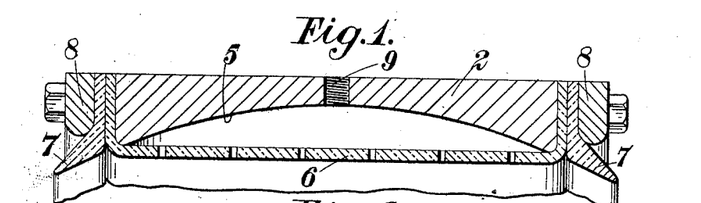
Figure 1 is a transverse section through one half of an annular member and its associated parts used to co-operate with a support according to one method of carrying out this invention.

Circumferential channels 19 are provided in the face of the support 1 opposite the jointing-rings 7 and these are provided with ducts 20 for connection to exhaust apparatus so that a vacuum or partial vacuum may be formed in the channels 19 for the purpose of holding the edges of the fabric in position on the support, as hereinafter described.

Figure 3:
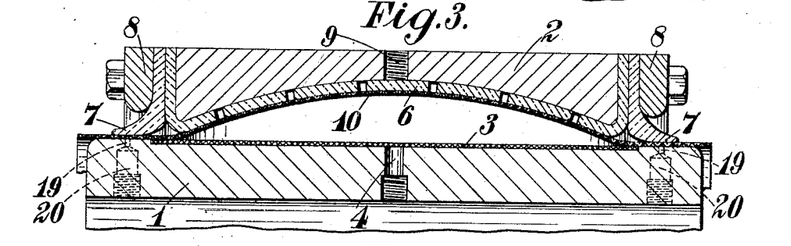
Figure 3 is a like view showing the same parts with the guide-rings removed.
Figure 4:
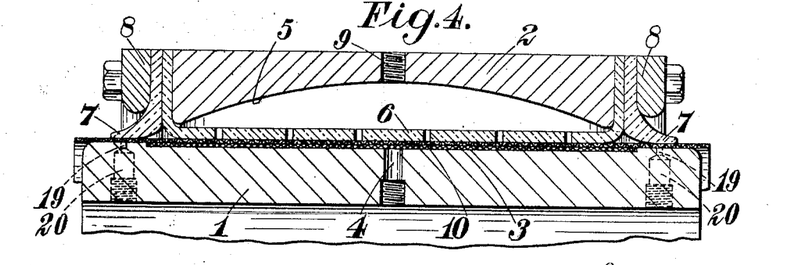
Figure 4 is a like view showing the same parts as in Figure 3 during a different step in the method of operation.
Figures 5, 6:
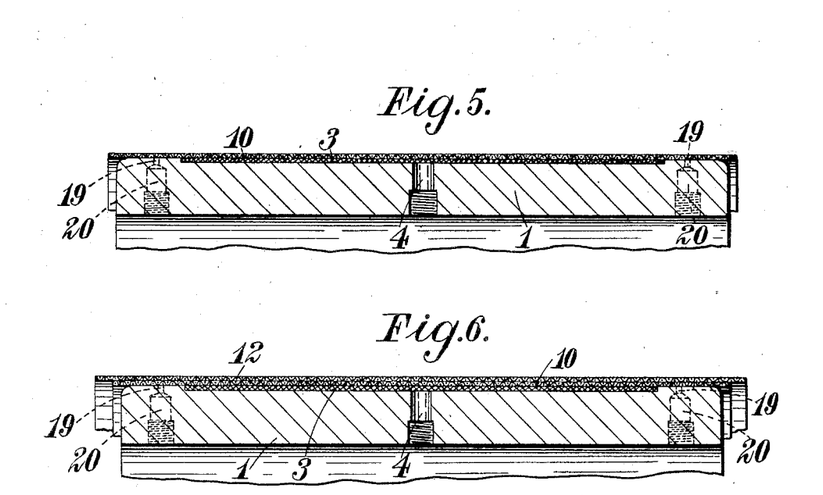
Figure 5 is a transverse section through one side of the support with a layer of fabric on it after contraction.
Figure 6 is a like view showing the parts illustrated in Figure 5 with a further layer of fabric thereon.
Figure 7:
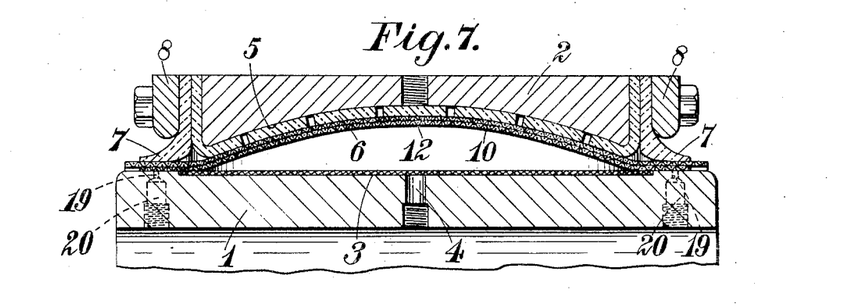
Figure 7 is a like view showing the parts illustrated in Figure 6 in place in the annular member which co-operates with them.

The use of this apparatus for contracting fabric is as follows:

A layer of fabric 10 is placed round the support as an endless band in the manner commonly adopted for making pneumatic tires. This fabric is preferably the well known Palmer tire fabric in which the threads are laid side by side without being interwoven and consequently each layer consists of two plies adhesively secured together by means of rubber with which the threads are treated, the threads of one ply lying obliquely to the threads of the other, and that layer of the endless band which is in contact with the support 1 is the one which afterwards is to be outermost in the tire, so that it is this layer which needs the greatest degree of contraction. The support 1 with the said layer in position is first introduced into the annular member 2, as shown in Figure 2, with the aid of guide-rings 11 which serve to temporarily press outwards the lips of the jointing-rings 7. The guide-rings are then removed so that the jointing-rings bear upon the layer of fabric, as shown in Figure 3. Air is now exhausted from the cavity 5 and by this means the fabric is forced by atmospheric pressure into the cavity, as shown in Figure 3. The jointing-rings 7, although serving to effect a seal with the fabric, do not prevent the edges from slipping inwards so that by bringing the fabric into the position shown in Figure 3 more of it is gathered up over that part of the face of the support 1 which lies between the jointing-rings than previously occupied this position. Air is now exhausted from the channels 19 to hold the edges of the fabric in the new position they have assumed in Figure 3, and then air is admitted through the conduit 9 to the cavity 5 whereupon the resiliency of the diagram 6 forces the fabric back more or less to the position shown in Figure 4, but in so doing the fabric is mechanically contracted because the edges cannot now slip outwards and therefore the increased quantity of fabric which has been drawn to the cavity has to be crowded down into the space afforded on the "flat" face of the support between the jointing-rings 7. To aid the return of the fabric to the position shown in Figure 4, air is exhausted from the channel occupied by the gauze 3 so that the fabric is pressed down upon the "flat" face of the support. The vacuum is maintained whilst the support is withdrawn from the member 2 so that the fabric is maintained in the contracted condition and remains flat on the support, as shown in Figure 5. As shown in Figure 6 a second layer of fabric 12 is then laid over the contracted layer 10 to which it will adhere by reason of the rubber compound by which the fabric is treated. This second layer 12 is uncontracted and serves as a retaining layer for the first, so that the air can now be admitted into the chamber occupied by the gauze 3. The process is now repeated with the two layers so that both are drawn into the recess 5 of the annular member 2, as shown in Figure 7, and then both are returned in the same manner as has been described with reference to Figure 4, and a third uncontracted layer constituting the retaining layer is placed over the two contracted layers. This treatment is repeated for as many layers as is required, and by this means it will be seen that the layer next to the support is always contracted more than the next and this is contracted more than that next to it, and the outermost layer, that is the one farthest from the support, is not contracted at all. When the fabric is shaped, this outer uncontracted layer becomes the inner layer and the innermost layer becomes the outermost layer so that the shaping process expands the previously contracted layers all in correct proportion, assuming the degree of contraction has been correct, and consequently all the layers are under approximate equal tension in the finished article.

Figure 8:
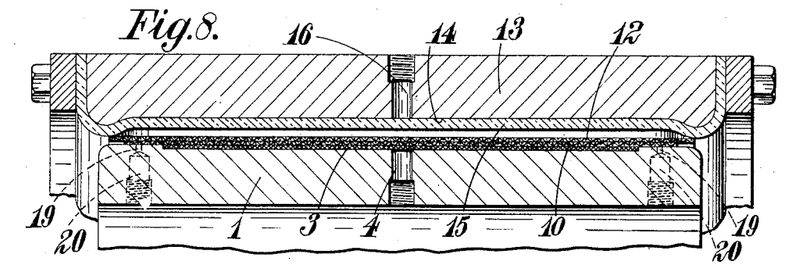
Figure 8 is a transverse section through one half of the support and an annular member for consolidating the fabric after treatment.
Figure 9:
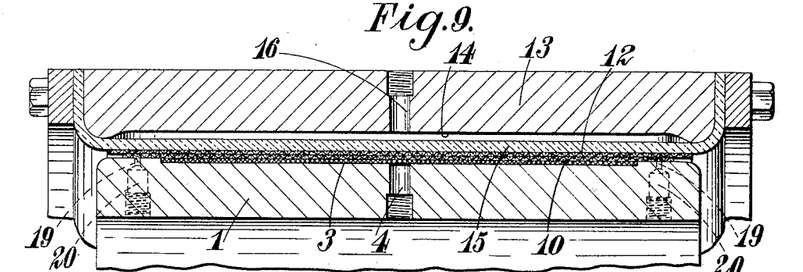
Figure 9 is a like view showing the same parts as are illustrated in Figure 8 but during a different step in the operations.

To consolidate the fabric after contraction it may, whilst still on the support 1, be placed within an annular consolidating member 13 as shown in Figure 8 which is recessed at 14 and has a diaphragm 15 stretched across the recess in much the same manner as the diaphragm 6 except that there are no perforations in the diaphragm 15 and it is reinforced with canvas to prevent undue stretching. The member 13 has a conduit 16 whereby air may first be exhausted from the recessed portion 14 to bring the diaphragm into the position shown in Figure 8 so that the support 1 with its layers of fabric 10 and 12 thereon may be readily brought into position. The fabric is kept flat on the support 1 by exhausting the air from the gauze-occupied space 3 and the channels 19, without which it would tend to curl. Air under pressure is then applied through the conduit 16 which forces the diaphragm down upon the fabric, as shown in Figure 9, and effects the necessary consolidation.

Instead of the annular surrounding member 2 with its single recess or channel 5, a member 21, shown in Figures 10–14, having a plurality of recesses 22 may be employed. These recesses take the form of parallel channels so that a corrugated surface results, and each recess is provided with a separate duct 23 except the two central recesses which communicate with a duct 24 common to them both. With this form of apparatus an annular support 25, similar in all respects to the support 1, is employed having channels 29 similar to the channels 19 of Figures 1–7.

Figures 10, 11:
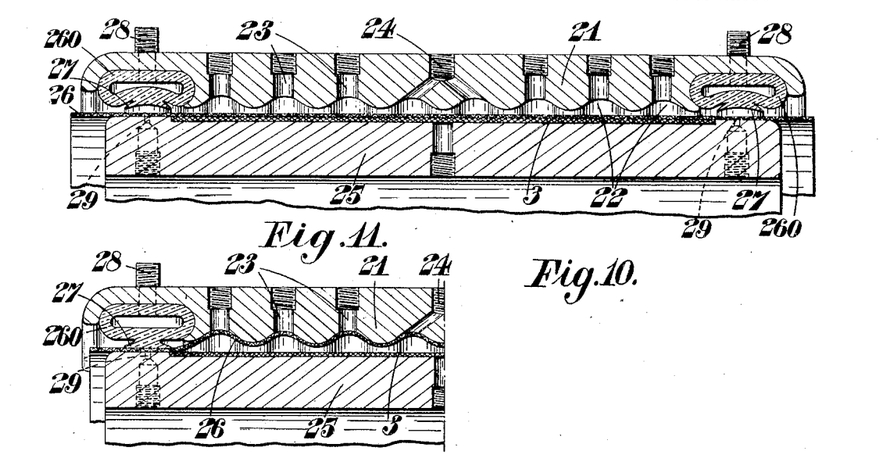
Figures 10–14 are transverse sections showing a modified form of apparatus for carrying out the same steps as are illustrated in Figures 1–7.
Figure 12:
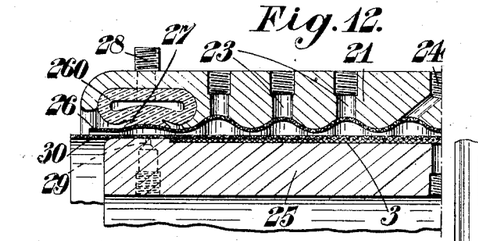
Figure 13:
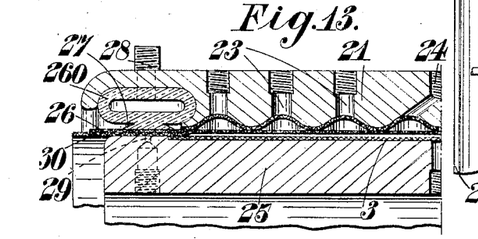
Figure 14:
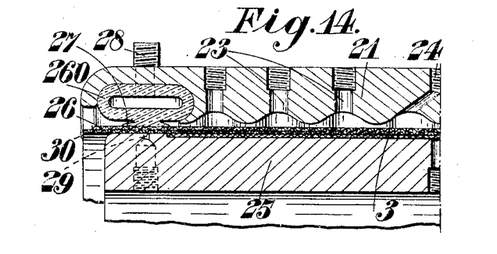
Figure 15:
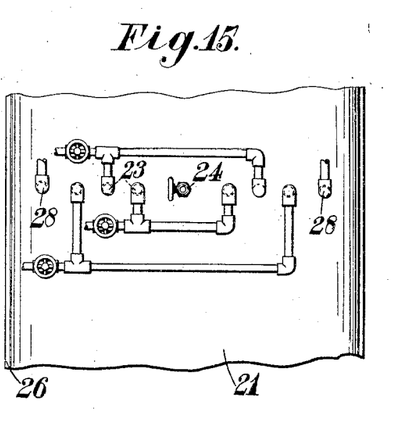
Figure 15 is a diagrammatic plan view of part of the construction according to Figure 10 showing the control of the pipes that open into the outer annular member.

The jointing-rings in Figures 10–14 are shown as hollow tubular bodies 260 having inwardly projecting lips 27. A duct 28 communicates with the interior of each jointing-ring and thus by exhausting the interior space the rings can be drawn up, as shown in Figure 10. With the rings in this position the support 25 with a layer 26 of fabric thereon can be brought into position. Air is then admitted to the rings so that they can by their own resilience take the position shown in Figure 11. Air is then exhausted from the grooves or channels 22 which brings the fabric into the position shown in Figure 11. To prevent stretching of the fabric, the exhausting may commence at the duct 24 and thus with the two central grooves, then with the two grooves on opposite sides of these first two and so on throughout the series until the outermost grooves are exhausted. Figure 15 diagrammatically illustrates the control of pipes leading to the channels 22 for exhausting them in order outwards in this manner. The rest of the operation of this apparatus may be the same as that described with reference to Figures 1–9, or instead of returning the layer 26 back against the face of the support and then placing another layer over it, it may be held against the member 21 whilst the support 25 is removed, another uncontracted layer 30 is placed thereon and then the support with this further layer on it is brought again into position, as shown in Figure 12. The jointing-rings can now be again operated, as shown in Figure 13, and then the layer 30 is brought into contact with the ridges of the layer 26, as shown in Figure 13. This bringing into contact may be effected by admitting air under pressure to the recess containing the gauze 3 or by reducing the pressure on the other side of the layer 30 as could be done by first perforating the layer 26 and then exhausting the air therethrough by means of the ducts 23 and 24. This preliminary contact with the ridges of the layer 26 causes the layer 30 to adhere thereto as the rubbered material employed is of an adhesive character. Finally, by admitting air under pressure to the channels 22, the layer 26 is returned upon the layer 30, in the contracted condition, as shown in Figure 14, and the layer 30 thus constitutes a retaining layer therefor.

Obviously, the apparatus in Figures 1–7 can be worked in the same manner, the layer which is about to be contracted being held against the member 2 whilst the retaining layer of uncontracted material is introduced.

The jointing-rings 260 may be pressed down by fluid under pressure admitted to the hollow interiors thereof for the purpose of holding the fabric against slipping during the return movement of the fabric towards the support 25, or the vacuum created in the channels 29 may be used to prevent the slipping of the fabric, as already described with reference to the channels 19 in Figures 1–7, or both may be used, the pressure in the jointing-rings and the vacuum in the channels.

The flat band of fabric produced according to the method described and by means of the apparatus set forth in this specification may be used in the same manner as other bands of fabric for the manufacture of tires.

Obviously, modifications may be introduced in the operation of the apparatus according to the results required.

If it is desired to contract a layer of fabric on to one or more layers on the support by atmospheric pressure, the layers on the support may be perforated at one or more points to permit of exhausting the air between the layer which is to be contracted and those which are already on the support.

The diaphragm 6 in addition to serving to return the layer of fabric helps to prevent puckering during such return movement.

It will be appreciated that the invention is not restricted to the manufacture of tire-bands, as obviously any article which can be made in a simple form, and then afterwards shaped to a more complex form may be provided with fabric contracted at those parts where the greater expansion in shaping is to occur to allow for such expansion without undue tension being put upon any one or more of the layers.

It will be understood that in the drawings the depth of the recess in the annular member for gathering up the fabric prior to contraction is exaggerated and the difference in the width of the fabric before and after contraction is exaggerated. The actual amount of contraction between any two adjoining layers would obviously depend upon the thickness of the fabric. A tire-band having four layers might when completed on the support have the innermost layer, that is the one next to the support and which will be outermost in the tire, contracted $7\frac{1}{2}\%$, the next 5%, the next outer one $2\frac{1}{2}\%$ and the outermost layer uncontracted.

The apparatus described above in this specification is not restricted to use for contracting the fabric during the manufacture of the tire-band, as it can also be employed for handling the tire-bands or for fabric-containing goods during manufacture. For example, when a support such as 1 shown in Figures 2–7, or a support such as 25 shown in Figures 10–14, is used as a former for carrying the tire-band, which may have been molded on it, the above described apparatus can be used for removing the band from or placing the same on to its support. One construction of tire-band removal apparatus will now be described by way of example with reference to Figures 16 and 17.

Figure 16:
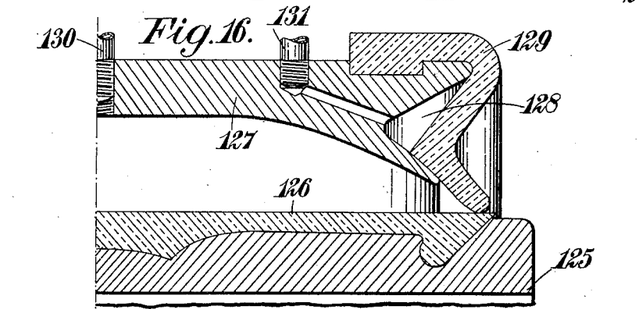
Figure 16 is a part section of tire-band removal apparatus comprising an annular member, a tire-band support and a vacuum chamber in position for operation.

A central cylindrical support 125 constitutes a former or mold on which a tire-band 126 has been vulcanized. This support with the band on it is introduced into an outer annular member 127 that is spaced away from the support and is held rigidly in relation thereto. In each side face of the member 127 is a V-shaped annular groove 128, and a jointing ring 129 is carried one at each side of the member 127. The ring 129 is molded so that it extends across its allotted groove and projects beyond the member 129 to provide a sealing lip. The jointing ring 129 is shaped to fit the groove 128, but is molded so that it normally lies out of the groove though covering the opening of the same, and the flexible lip always lies beyond the groove so as to effect the requisite sealing with the tire-band. A conduit 130 for connection with exhaust apparatus opens through the member 127 into the chamber that is formed by the member 127, its two jointing rings, and the band 126, so that this chamber can be exhausted of air. Two other conduits, whereof only one is shown at 131, open each into one of the grooves 128 and connect the latter with exhaust apparatus independently of the conduit 130 that leads to the vacuum chamber.

To enable the support 125 with the band 126 thereon to be brought into position, a tool in the form of a ring, not shown, may be temporarily inserted into the ring 129 on one side of the member 127, through which the tire-band support is to be brought into position. This tool will be of larger diameter than the support 125 and the tire-band 126 thereon, so that it will hold the lip of the jointing ring 129 back to permit of the easy introduction of the support. When the support is in place, the parts occupy the position shown in Figure 16, from which it will be understood that the lips of the two jointing rings lie in contact with the edges of the tire-band. Air is now exhausted from the vacuum chamber and, if required, from the grooves 128 also, which will cause the tire-band to be expanded away from the support 125 until it assumes approximately the position shown in Figure 17. The support 125 can then be removed without difficulty.

Figure 17:
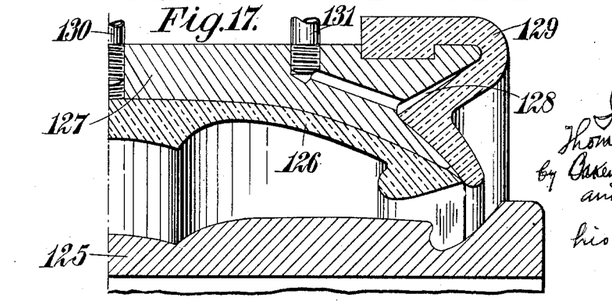
Figure 17 is a like view showing the same parts as in Figure 16, but at a different stage of the operation.

Instead of using an annular tool as described above for raising a sealing lip for the insertion of the support, air may be exhausted from one or both of the grooves 128, whereupon the jointing rings 129 will be drawn into the grooves as shown in Figure 17. The support can then be inserted without difficulty.

The tire-band may, in some cases, be vulcanized on the inner periphery of an annular mold member, in which case it would be removed by a vacuum-chamber within the mold and tire-band.

Instead of using the jointing rings 129, the sealing rings having a hollow base as described above with reference to Figures 10 to 14 may be employed. Alternatively, jointing rings of a different section that project laterally outwards from the annular member carrying them may be employed as described in my United States Patent No. 1,399,898, December 13, 1921.

What I claim as my invention and desire to secure by Letters Patent is:

1. A method of contracting rubbered fabric, consisting in placing the fabric in a "flat" condition transversely across a given space, gathering up under fluid pressure an increased area of fabric within the said space, retaining the edges of the gathered-up fabric at the margins of said space, causing the gathered-up fabric to assume under fluid pressure a "flat" condition transversely across the said given space, and retaining the fabric in the contracted condition.

2. A method of manufacturing a compound fabric including superposed layers of rubbered fabric disposed in a flat condition, comprising the steps of mechanically contracting a layer of fabric, which after such contraction is still in flat condition, and superposing on such contracted flat layer and securing thereto at least one additional layer of uncontracted fabric.

3. A method of manufacturing an endless flat tire-band having superposed layers of rubbered fabric each in the form of an endless band, comprising the steps of axially contracting one of the endless layers of fabric under fluid pressure in such manner that the said layer, after such contraction, is in flat condition, and superposing thereon and adhesively securing thereto at least one additional endless layer which is not contracted.

4. A method of manufacturing an endless "flat" tire-band having superposed layers of rubbered fabric each in the form of an endless band, comprising the steps of mechanically contracting one of the endless layers, adhesively securing a second endless layer thereto, then submitting both these layers to a mechanical contracting action, and so on until the required number of superposed layers is obtained.

5. A method of manufacturing an endless "flat" tire-band having superposed layers of rubbered fabric each in the form of an endless band, comprising the steps of corrugating one of the layers under fluid pressure, applying a "flat" adhesive endless layer thereto, and "flattening" the said corrugated layer on to the said adhesive layer.

6. A method of manufacturing an endless "flat" tire-band having superposed layers of rubbered fabric each in the form of an endless band, comprising the steps of disposing one of the endless layers in a "flat" condition on a support, bulging under fluid pressure the central portion of said layer away from the support whilst holding the lateral portions thereof in such manner that they can slide to permit of such bulging without increasing the diameter of the lateral portions, then forcing the layer under fluid pressure back to a "flat" condition on the support whilst holding the lateral portions already against the support from sliding, and adhesively securing a retaining endless layer to the thus contracted layer.

7. The combination of a member for supporting a layer of flexible material, a second member mounted in fixed and spaced relationship to the first, sealing means carried by one of said members and forming therewith a recess at that face which is towards the other member and so arranged as to bear on the material carried by the supporting member along a line surrounding the said recess and thrust the material firmly against the supporting member, and means for establishing a fluid pressure on that side of the material which is remote from the recess in excess of the pressure in the recess.

8. In apparatus for use in the manufacture of "flat" endless tire-bands, the combination of an inner cylindrical member for supporting on its outer periphery an endless layer of flexible material, an outer fixed annular member surrounding the same and spaced away therefrom, annular sealing means carried by said outer member and forming therewith an annular circumferential recess at its inner face and so arranged as to bear on the lateral portions of the material carried by the inner member and thrust the material firmly against the same, and means for establishing a fluid pressure on that side of the material which is remote from the recess in excess of the pressure in said recess.

9. In apparatus for use in the manufacture of "flat" endless tire-bands, the combination of an inner member for supporting on its outer periphery an endless layer of flexible material, an outer fixed annular member surrounding the same and spaced away therefrom, flexible lips carried by said outer member, one on each side thereof, forming therewith an annular circumferenital recess at its inner face and so arranged as to bear on lateral portions of the material carried by the inner member and thrust the material against the same, and means for establishing a fluid pressure on that side of the material which is remote from the recess in excess of the pressure in said recess.

10. In an apparatus for use in the manufacture of "flat" endless tire-bands, the combination of an inner cylindrical member for supporting on its outer periphery an endless layer of flexible material, an outer fixed annular member which is concentric with said support and is spaced away therefrom and has its inner face recessed, annular sealing means carried by said outer member and so arranged as to bear on the lateral portions of the material carried by the inner member and thrust the material firmly against the latter, and means for establishing a fluid pressure on that side of the material which is remote from the recess in excess of the pressure in said recess.

11. In apparatus for use in the manufacture of "flat" endless tire-bands, the combination of an inner cylindrical member for supporting on its outer periphery an endless layer of flexible material, an outer fixed annular member concentric with said support and spaced away therefrom, two hollow jointing rings secured one on each side of said annular member and forming therewith an annular circumferential recess at its inner periphery, which rings have lips arranged to bear on said material on said support, two ducts opening each into one of said rings for the flow of a fluid to and from the same, and means for establishing a fluid pressure at one side of the material when it is is placed between said support and said lips.

12. In apparatus for use in the manufacture of "flat" endless tire-bands, the combination of an inner member for supporting on its outer periphery an endless layer of flexible material, an outer fixed annular member surrounding the same and spaced away therefrom, flexible lips carried by said outer member, one on each side thereof, forming therewith an annular circumferential recess at its inner face and so arranged as to bear on the edges of the material carried by the inner member and thrust the material against the same, and means for establishing a fluid pressure on that side of the material which is remote from the recess in excess of the pressure in said recess, which flexible lips are of such length that when they contact with the said material and form therewith and with the annular member a chamber, this chamber can be collapsed by exhausting the air therefrom.

13. In apparatus for use in the manufacture of "flat" endless tire-bands, the combination of an inner cylindrical member for supporting on its outer periphery an endless band of flexible material, an outer fixed annular member having a recessed inner periphery surrounding the same and spaced away therefrom, a perforated rubber diaphragm stretched across said recess, annular sealing means carried by said outer member on each side thereof and so arranged as to bear on said band for forming therewith a closed chamber, and means for creating a higher pressure on one side of said band than on the other side.

14. In apparatus for use in the manufacture of "flat" endless tire-bands, the combination of an inner cylindrical member for supporting on its outer periphery an endless band of flexible material, an outer fixed annular member surrounding the same and spaced away therefrom, annular sealing means carried by said outer member and having lips arranged to bear on said band on said support and form therewith and with said annular member a chamber, means for establishing a partial vacuum in said chamber, and means for establishing a partial vacuum beneath said band at that face of said support on which it is carried.

15. In apparatus for use in the manufacture of "flat" endless tire-bands, the combination of an inner cylindrical member for supporting on its outer periphery an endless layer of flexible material, an outer fixed annular member surrounding the same and spaced away therefrom, annular sealing rings carried one at each side of said outer member and forming therewith an annular circumferential recess at its inner face and so arranged as to bear on the lateral portions of the material carried by the inner member and thrust the material firmly against the latter, peripheral recesses in said inner member, one under each of said rings, ducts opening into said peripheral recesses for the flow of a fluid to and from the same, and means for establishing a fluid pressure on that side of the material which is remote from the recess in excess of the pressure in said recess.

16. In apparatus for use in the manufacture of "flat" endless tire-bands, the combination of an inner cylindrical member having a recess in its outer periphery, a layer of gauze in said recess with its outer face flush with the edges of said recess thereby providing a "flat" face to the inner member for carrying an endless layer of flexible material, an outer fixed annular member surrounding the inner member and spaced away therefrom, annular sealing means secured on each side of said outer member and having lips arranged to bear on said layer on said inner member and form a chamber with the said annular member and said band, and a duct opening into said chamber for the flow of a fluid to and from the same.

17. In apparatus for use in the manufacture of endless tire-bands, the combination of an inner cylindrical member for supporting on its outer periphery an endless layer of flexible material, an outer fixed annular member surrounding the same and spaced away therefrom and provided on its inner periphery with a plurality of endless parallel grooves, annular sealing means carried by said outer member and forming therewith an annular circumferential chamber at its inner face, which sealing means are so arranged as to bear on the lateral portions of the material carried by the inner member and thrust the material against the same, and means for establishing a fluid pressure on that side of the material which is remote from the said chamber in excess of the pressure in said chamber.

18. In apparatus for use in the manufacture of "flat" endless tire-bands, the combination of an inner cylindrical member for supporting on its outer periphery an endless layer of flexible material, an outer fixed annular member surrounding the same and spaced away therefrom and provided with a plurality of endless parallel grooves in its inner periphery, a plurality of ducts opening one into each of said grooves for the flow of a fluid to and from the same, and annular sealing members secured one on each side of said annular member arranged to bear on the material for forming a closed chamber with the annular member and said layer.

19. In apparatus for use in the manufacture of "flat" endless tire-bands, the combination of an inner cylindrical member for supporting on its outer periphery an endless layer of flexible material, an outer fixed annular member surrounding the same and spaced away therefrom and provided in its inner periphery with a plurality of parallel endless grooves, a plurality of ducts opening one into each of said grooves for exhausting air from and admitting air into grooves, means for controlling said ducts in such order that the channels situated nearest the centre of said annular member are first opened, then the two which lie on opposite sides farther out, and so on to those which lie farthest from the centre, and two annular sealing members secured one on each side of said annular member and so arranged as to bear on the material on the support for forming a closed chamber with the annular member and said material.

20. In apparatus for use in the manufacture of "flat" endless tire-bands, the combination with an inner cylindrical support for an extensible band of flexible material to be carried thereby, of an outer fixed annular member surrounding the same and spaced away therefrom, annular sealing means carried by said outer member at both sides thereof and arranged to bear on said material on the support and form an annular chamber therewith and with the annular member, means for establishing a pressure below atmospheric in said chamber, said chamber being of such dimensions as will ensure that when it is exhausted and the band will be expanded so that it leaves its support, the latter can be removed as a single piece.

21. A method of manufacturing an endless flat tire-band having superposed layers of rubbered fabric each in the form of an endless band, comprising the steps of axially contracting one of the endless layers by drawing its edges together under fluid-pressure and superposing thereon and adhesively securing thereto at least one additional endless layer which is not so contracted.

22. A method of manufacturing an endless flat tire-band having superposed layers of rubbered fabric each in the form of an endless band, and which is afterwards to be shaped to tire form, comprising subjecting to a greater degree of mechanical contraction those layers which are to be subjected to a greater degree of distortion when the band is shaped to tire form.

23. In the method of manufacturing tires, the steps consisting of compacting a relatively wide layer of fabric into a space having less area than the original area of the fabric, superposing a second layer thereon and subjecting the second layer to the same operation.

24. In the method of manufacturing tires, the steps consisting of compacting a relatively wide layer of fabric into a space having less area than the original area of the fabric, superposing thereon and securing thereto a second layer, and repeating said compacting operation.

In testimony whereof I affix my signature.

THOMAS SLOPER.